(12) United States Patent
Iannotti

(10) Patent No.: US 10,749,612 B1
(45) Date of Patent: Aug. 18, 2020

(54) ROTOR ASSEMBLY SENSOR SYSTEM WITH INTERFERENCE ISOLATION

(71) Applicant: General Electric Company, Schenectady, NY (US)

(72) Inventor: Joseph Alfred Iannotti, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/445,622

(22) Filed: Jun. 19, 2019

(51) Int. Cl.
| | |
|---|---|
| *H04B 1/10* | (2006.01) |
| *H04B 15/02* | (2006.01) |
| *F01D 21/00* | (2006.01) |
| *H01Q 1/22* | (2006.01) |

(52) U.S. Cl.
CPC ........... *H04B 15/02* (2013.01); *F01D 21/003* (2013.01); *H01Q 1/22* (2013.01)

(58) Field of Classification Search
CPC ...... G01K 11/22; G01K 13/08; H04B 5/0056; H04B 15/00; H01Q 25/00; H01Q 1/22; F01D 21/003; F01D 17/02; G01L 1/10; G01L 3/10; G01L 3/04
See application file for complete search history.

(56) References Cited

U.S. PATENT DOCUMENTS

| | | | |
|---|---|---|---|
| 9,760,748 B2 | 9/2017 | Iannotti et al. | |
| 9,806,390 B2 | 10/2017 | Lee et al. | |
| 10,225,026 B2 | 3/2019 | Lee et al. | |
| 2015/0349612 A1* | 12/2015 | Ito | G01K 1/024 310/68 B |
| 2015/0372751 A1* | 12/2015 | Shinoda | H01Q 7/00 455/66.1 |
| 2017/0350253 A1 | 12/2017 | Jacobs et al. | |
| 2018/0359004 A1 | 12/2018 | Lee et al. | |

* cited by examiner

*Primary Examiner* — Nhan T Le
(74) *Attorney, Agent, or Firm* — The Small Patent Law Group LLC; Philip S. Hof

(57) ABSTRACT

A sensor system includes a rotor antenna, a radio frequency (RF) sensor, a stator antenna, and one or more frequency selective structures. The rotor antenna and the RF sensor are disposed on an outer surface of a shaft and are conductively connected to each other. The RF sensor generates measurement signals as the shaft rotates. The stator antenna is mounted separate from the shaft and positioned radially outward from the rotor antenna. The stator antenna wirelessly receives the measurement signals from the rotor antenna across an air gap. The one or more frequency selective structures are disposed on the outer surface of the shaft and configured to dissipate electromagnetic current that is conducted along the shaft to alleviate interference of the measurement signals.

21 Claims, 5 Drawing Sheets

ROTOR ASSEMBLY SENSOR SYSTEM WITH INTERFERENCE ISOLATION

FIELD

The subject matter described herein relates to a sensor system incorporated with a rotor assembly to determine one or more properties of a rotating shaft of the rotor assembly, where the sensor system includes interference resistance.

BACKGROUND

Power-generating machines, such as internal combustion engines, motors, and generators, typically include rotary assemblies featuring rotating shafts. Sensors may be used to monitor and measure certain properties of a rotating shaft within a power-generating machine to evaluate performance and/or health of the power-generating machine. For example, monitoring properties such as torque, temperature, rotating speed, and strain of the shaft may enable early detection of sub-optimal machine performance and/or components needing maintenance.

Monitoring one or more properties of the rotating shaft of a rotary assembly typically requires one or more discrete sensors installed on or proximate to the shaft. The signals generated by the one or more sensors may be remotely communicated to a processing unit, such as a controller, that is spaced apart from the shaft for analysis of the signals to determine the measured properties. The signals generated by the one or more sensors are susceptible to electromagnetic interference during the communication of the signals to the processing unit, which degrades the signal-to-noise ratio. Interference outside of the operating frequency range of the sensor system (e.g., outside of the sensor signal frequencies) can be filtered using traditional filter technology in the signal transmission pathway, but interference at frequency bands within the operating frequency range of the sensor system cannot be filtered because the sensor signals would be filtered as well. The interference may mask the sensor signals, reducing the likelihood that the processing unit is able to correctly interpret the signals. As a result, the sensor system may have diminished accuracy or, in some cases, may be completely inoperable.

To block electromagnetic interference, electrically conductive shielding may be utilized to surround portions of the sensor systems. However, it is difficult to provide adequate shielding around a sensor disposed on a rotating shaft because electromagnetic surface currents can be conducted along the length of the shaft. Shielding that physically contacts the surface of the shaft to block such surface currents may introduce additional costs and challenges, such as increased wear on the shaft due to the rubbing of the shielding, the need for more frequent maintenance, excessive heat generated by the rubbing, and/or the like. A need remains for a sensor system that can be incorporated with a rotating shaft of a rotor assembly to accurately determine one or more properties of the shaft by limiting or resisting electromagnetic interference on the sensor system.

SUMMARY

In one or more embodiments, a sensor system is provided that includes a rotor antenna, a radio frequency (RF) sensor, a stator antenna, and one or more frequency selective structures. The rotor antenna is disposed on an outer surface of a shaft configured to rotate about a center axis of the shaft. The RF sensor is disposed on the outer surface of the shaft and conductively connected to the rotor antenna. The RF sensor is configured to generate measurement signals as the shaft rotates. The stator antenna is mounted separate from the shaft such that the rotor antenna and the RF sensor rotate with the shaft relative to the stator antenna. The stator antenna is positioned radially outward from the rotor antenna and wirelessly connected to the rotor antenna across an air gap to receive the measurement signals from the rotor antenna. The one or more frequency selective structures are disposed on the outer surface of the shaft and configured to dissipate electromagnetic current that is conducted along the shaft to alleviate interference of the measurement signals.

In one or more embodiments, a sensor system is provided that includes a rotor antenna, a radio frequency (RF) sensor, a stator antenna, an enclosure, and one or more frequency selective structures. The rotor antenna is disposed on an outer surface of a shaft configured to rotate about a center axis of the shaft. The RF sensor is disposed on the outer surface of the shaft and conductively connected to the rotor antenna. The RF sensor is configured to generate measurement signals as the shaft rotates. The stator antenna is mounted separate from the shaft such that the rotor antenna and the RF sensor rotate with the shaft relative to the stator antenna. The stator antenna is positioned radially outward from the rotor antenna and wirelessly connected to the rotor antenna across an air gap to receive the measurement signals from the rotor antenna. The enclosure surrounds at least the rotor antenna, the RF sensor, and the stator antenna. The enclosure is electrically conductive and includes first and second side walls that define respective openings through which the shaft protrudes. The one or more frequency selective structures are disposed on the outer surface of the shaft and configured to dissipate electromagnetic current that is conducted along the shaft to alleviate interference of the measurement signals.

In one or more embodiments, a method (e.g., for installing a sensor system on a rotor assembly) is provided that includes disposing a rotor antenna and a radio frequency (RF) sensor on an outer surface of a shaft configured to rotate about a center axis of the shaft. The RF sensor is conductively connected to the rotor antenna and configured to generate measurement signals as the shaft rotates. The rotor antenna is configured to transmit the measurement signals across an air gap to a stator antenna that is positioned radially outward from the rotor antenna. The method includes disposing one or more frequency selective structures on the outer surface of the shaft. The one or more frequency selective structures are configured to dissipate electromagnetic current conducted along the shaft to alleviate interference of the measurement signals.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
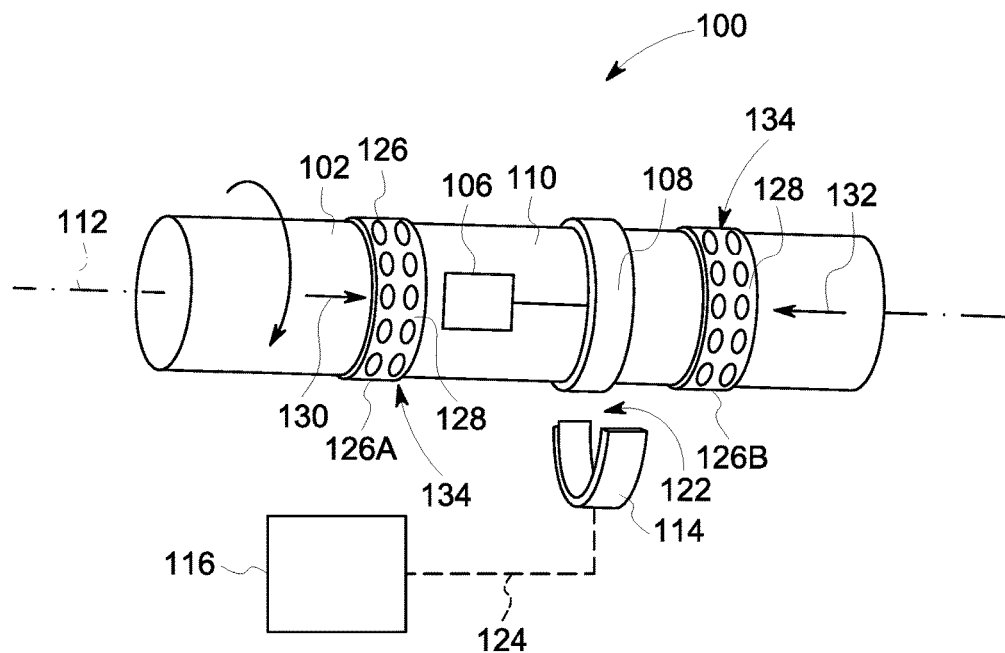
FIG. 1 is a schematic illustration of a sensor system incorporated with a shaft of a rotor assembly according to an embodiment.

The embodiments described herein provide a sensor system configured to be incorporated with a rotor assembly that includes a rotating shaft. The sensor system is designed to determine by direct measurement or derivation one or more properties of the rotating shaft, including, for example, torque, strain, power output, temperature, rotational speed, and/or the like. The sensor system includes a rotor antenna and a radio frequency (RF) sensor that are disposed on the shaft of the rotor assembly and move with the shaft as the shaft rotates. The RF sensor generates signals, referred to herein as measurement signals, as the shaft rotates. The measurement signals are communicated by the rotor antenna to a stator antenna that is separate from the shaft and wirelessly connected to the rotor antenna across an air gap. The stator antenna is configured to communicate the measurement signals to a controller including one or more processors for the controller to analyze the measurement signals to determine one or more properties of the shaft.

The rotor assemblies referred to herein are used broadly to refer to machinery that includes at least one rotating shaft which rotates relative to a static member, such as a housing or frame of the machinery. A rotor assembly may represent, or be a component of, an engine, a motor, a generator, a vehicle, an appliance, an industrial machine, or another machine with at least one rotating shaft.

In one or more embodiments, the RF sensor of the sensor system is a surface acoustic wave (SAW) sensor that includes multiple resonators. For example, the SAW sensor may be passive, such that the SAW sensor generates a measurement signal in response to receiving a stimulus signal generated by an interrogator device, which optionally may be the controller that also reads the measurement signals. The SAW sensor may be powered by the energy of the stimulus signal. The energy of the stimulus signal may cause the resonators to resonate at certain frequencies that are based on properties or characteristics of the shaft. Optionally, the stimulus signal may include a frequency spectrum that defines an operating frequency range. The measurement signal that is generated by the SAW sensor and transmitted back to the stator antenna may include a frequency spectrum with nulls or voids in the spectrum corresponding to the frequencies at which the resonators of the SAW sensor resonate. The measurement signals may be monitored to determine (e.g., measure or derive) properties of the shaft, such as strain, temperature, torque, rotational speed, power output, or the like.

The sensor system described herein is configured to resist electromagnetic interference (also referred to herein as extraneous RF energy) that could mask the measurement signals or otherwise degrade the signal-to-noise ratio of the sensor system. The sensor system may resist interference by blocking, absorbing, reflecting, or dissipating RF energy conducted along the shaft and radiated through the air. For example, an electrically-conductive enclosure may be installed around various components of the sensor system to shield the sensor system from radiated Rf energy. Because the enclosure may need to provide openings with clearance to accommodate the shaft, RF surface currents conducted along the shaft may still enter and/or exit the enclosure through the openings, contributing to interference.

In one or more embodiments, the sensor system includes frequency selective (FS) structures (also referred to as frequency selective surface structures) that are disposed on the shaft to absorb and dissipate surface currents that could penetrate the enclosure and interfere with signal propagation. The FS structures may be selected and/or designed to resonate at specific frequency bands that overlap the SAW sensor operating frequency range. For example, the frequency bands may encompass the operating frequency range such that the frequency bands are broader than the operating frequency range, or the frequency bands may be narrower than the operating frequency range and disposed within the operating frequency range. The FS structures may absorb and dissipate extraneous RF surface currents along the shaft and also radiated RF energy. As a result, the frequencies of the surface currents that are dissipated by the FS structures advantageously cannot mask the same frequencies within the measurement signals generated by the SAW sensor. By dampening and/or dissipating the extraneous electromagnetic interference, the FS structures provide RF interference isolation and improved interference susceptibility for the sensor system. The FS structures may also dissipate surface currents along the shaft generated by the sensor system to alleviate interference on other, external devices caused by the sensor system.

The sensor system includes FS structures disposed directly on the rotating shaft. The FS structures may be applied on the shaft via adhesive (e.g., as peel and stick decals or stickers). Alternatively, the FS structures may be formed in-situ on the shaft. For example, the components of the FS structures, such as conductors and dielectrics, may be directly printed (e.g., via 3D printing) onto the outer surface of the shaft. Optionally, FS structures may also be disposed on the enclosure or other proximate structural bodies to absorb and dissipate extraneous RF energy.

FIG. 1 is a schematic illustration of a sensor system 100 incorporated with a shaft 102 of a rotor assembly according to an embodiment. The sensor system 100 includes an RF sensor 106 disposed on the shaft 102 and a rotor antenna 108 also disposed on the shaft 102. For example, both the RF sensor 106 and the rotor antenna 108 are rigidly secured (e.g., fixed in place) on an outer surface 110 of the shaft 102. The RF sensor 106 is conductively connected to the rotor antenna 108 via one or more wires, traces along a substrate, or the like. The shaft 102 is cylindrical and oriented along a center axis 112. The shaft 102 is configured to rotate clockwise and/or counterclockwise about the center axis 112. The RF sensor 106 and the rotor antenna 108 rotate with the shaft 102 about the center axis 112.

The sensor system 100 also includes a stator antenna 114 that is separate and spaced apart from the shaft 102. The stator antenna 114 does not rotate with the shaft 102. The stator antenna 114 is disposed radially outward from the rotor antenna 108. The stator antenna 114 is aligned with the rotor antenna 108, such that the rotor and stator antennas 108, 114 are located at substantially the same position along the length of the axis 112. For example, the stator antenna 114 may radially overlap at least a portion of the rotor antenna 108 such that a line radially extending from the axis 112 through the rotor antenna 108 may intersect the stator antenna 114 as well. The stator antenna 114 may be mounted on or to a stator member 120 (shown in FIG. 2) that is discrete from the shaft 102. The stator member optionally may represent or may be disposed within an electrically conductive enclosure that provides electromagnetic shielding. The stator antenna 114 may be rigidly secured to the stator member 120. The rotor antenna 108 is radially spaced apart from the stator antenna 114 by an air gap 122. The rotor antenna 108 is wirelessly, such as inductively, connected to the stator antenna 114 across the air gap 122.

The stator antenna 114 is communicatively connected to a controller 116 of the sensor system 100. The controller 116 is spaced apart from the shaft 102. The controller 116 may be connected to the stator antenna 114 via a wired or wireless pathway 124. In operation, the RF sensor 106 is configured to generate measurement signals as the shaft 102 spins or rotates. The measurement signals are communicated from the RF sensor 106 to the rotor antenna 108, and from the rotor antenna 108 to the stator antenna 114 across the air gap 122. The controller 116 monitors one or more electrical characteristics of the measurement signals over time as the shaft 102 rotates. The controller 116 is configured to determine the one or more properties of the shaft 102 based on the electrical characteristics of the measurement signals.

In an embodiment, the RF sensor 106 may be a passive sensor module that does not have an onboard or connected power source, such as a battery or energy harvesting device. The RF sensor 106 may be configured to generate the measurement signals in response to receiving stimulus signals, such that the energy of the stimulus signals is utilized to power the generation and communication of the measurement signals. For example, the controller 116 may represent both an interrogator and a reader. As an interrogator, the controller 116 generates a stimulus signal and controls the transmission of the stimulus signal from the stator antenna 114 to the RF sensor 106 via the rotor antenna 108. The RF sensor 106 may generate a measurement signal upon receipt of the stimulus signal by utilizing the energy of the stimulus signal. As a reader, the controller 116 receives and analyzes the measurement signal that is generated by the RF sensor 106 responsive to receiving the stimulus signal. In an embodiment, the components of the sensor system 100 disposed on the shaft 102 are passive, which avoids mounting batteries or other active power components on or near the shaft 102. Such active power components may interfere with narrow clearances in the rotor assembly. Without having active power components, the shaft-mounted components of the sensor system 100 may be relatively thin and able to fit within narrow clearances between the shaft and the stator. The sensor system 100 may be retrofit onto existing rotor assemblies that are not designed to accommodate sensors disposed on the shafts.

Although a single RF sensor 106 is shown in FIG. 1, the sensor system 100 may include multiple RF sensors 106 mounted at different locations on the shaft 102. For example, another RF sensor 106 may be disposed on the outer surface 110 of the shaft 102 at an opposite circumferential position relative to the visible RF sensor 106 (e.g., along a back-facing circumferential region of the shaft). Furthermore, the sensor system 100 optionally may include more than one rotor antenna 108 and more than one stator antenna 114 located at different axial locations along the length of the shaft 102. For example, the illustrated rotor antenna 108 and stator antenna 114 define a first wirelessly connected pair, and the sensor system 100 may include at least one other wirelessly connected pair spaced apart from the first wirelessly connected pair. For example, a second wirelessly connected pair may be configured to communicate measurement signals generated by a second RF sensor to the controller 116. The controller 116 may be configured to compare the measurement signals generated by the multiple different RF sensors 106 when determining one or more properties of the shaft 102, such as torque, bending, fatigue, stress, strain rate, or the like.

The sensor system 100 includes one or more frequency selective (FS) structures 126 disposed on the outer surface 110 of the shaft 102. The one or more FS structures 126 are configured to absorb and dissipate electromagnetic current that is conducted along the shaft 102 to alleviate interference of the measurement signals by the electromagnetic current. As used herein, the FS structures 126 may alleviate masking of the measurement signals by reducing the detrimental effect of the undesired electromagnetic current on the generation and transmission of the measurement signals. The FS structures 126 may alleviate the interference on the measurement signals by reducing the severity of the interference or making the effect essentially negligible. The FS structures 126 may dissipate specific frequencies of extraneous RF energy that would otherwise interfere with, or mask, the transmission and interpretation of the measurement signals. The FS structures 126 may alleviate the masking of the measurement signals by attenuating the energy of the electromagnetic surface currents that would interfere with the measurement signals. In one or more embodiments, the FS structures 126 include resonant elements 128 that are configured to resonate at specific frequency bands. Electromagnetic surface currents conducted along the shaft 102 may cause the resonant elements 128 to resonate at the specific frequency bands. The resonating elements 128 convert the electrical energy that is absorbed to mechanical energy, which is dissipated as heat (e.g., thermal energy).

Each FS structure 126 may include or represent a thin layer or sheet designed to reflect, absorb, and/or dissipate electromagnetic fields based on the frequency of the field. The resonant elements 128 may provide this filtering effect. For example, the resonant elements 128 may be disposed in a regular, repeating pattern on the layer. The resonant elements 128 may be spaced apart from one another and arranged in a two-dimensional array 134. The array 134 of resonant elements 128 may circumferentially extend along the outer surface 110 of the shaft 102. Optionally, the array 134 may extend around a full circumference of the shaft 102. The resonant elements 128 may be electrically conductive, such as composed of metal traces or features. The metal traces or features are formed into a specific geometrical shape. The resonant elements 128 have inherent inductance and capacitance to enable the resonant elements 128 to resonate at specific frequency bands.

The FS structures 126 may be disposed on the shaft 102 at locations between the RF sensor 106 and rotor antenna 108, on one side, and a source of the electromagnetic surface currents, on the other side. Therefore, the electromagnetic surface currents must traverse the FS structures 126 prior to reaching the RF sensor 106 and rotor antenna 108. The FS structures 126 may diminish the magnitude of the surface currents that traverse beyond the FS structures 126 to the RF sensor 106 and rotor antenna 108, particularly the magnitude of specific frequencies of the surface currents that could mask the generation and/or transmission of the measurement signals. For example, the FS structures 126 may be configured to absorb and dissipate frequencies of current that encompass or are within a designated operating frequency range of the RF sensor 106. The measurement signals may be generated and/or transmitted within the operating frequency range. The dissipation of such energy reduces the amount of energy that could mask or otherwise interfere with the measurement signals, increasing the signal-to-noise ratio of the sensor system 100 relative to not dissipating such frequencies. The FS structures 126 may be configured to allow frequencies outside of the operating frequency range to pass beyond the FS structure 126 towards the RF sensor 106 and rotor antenna 108 because these frequencies may not negatively impair the operation of the sensor system 100. For example, the sensor system 100 may be configured to focus on frequencies within the operating range by disregarding or actively filtering out frequencies outside of the operating range.

In the illustrated embodiment, the one or more FS structures 126 includes a first FS structure 126A and a second FS structure 126B. The first and second FS structures 126A, 126B are spaced apart from each other along the length of the shaft 102. The rotor antenna 108 and the RF sensor 106 are axially disposed between the first FS structure 126A and the second FS structure 126B along the shaft 102 length. Therefore, the first FS structure 126A may absorb and dissipate surface currents conducted in a first axial direction 130 towards the RF sensor 106 and rotor antenna 108, and the second RF structure 126B may absorb and dissipate surface currents conductive in a second axial direction 132 towards the RF sensor 106 and rotor antenna 108. The first axial direction 130 is opposite the second axial direction 132.

Figure 2:
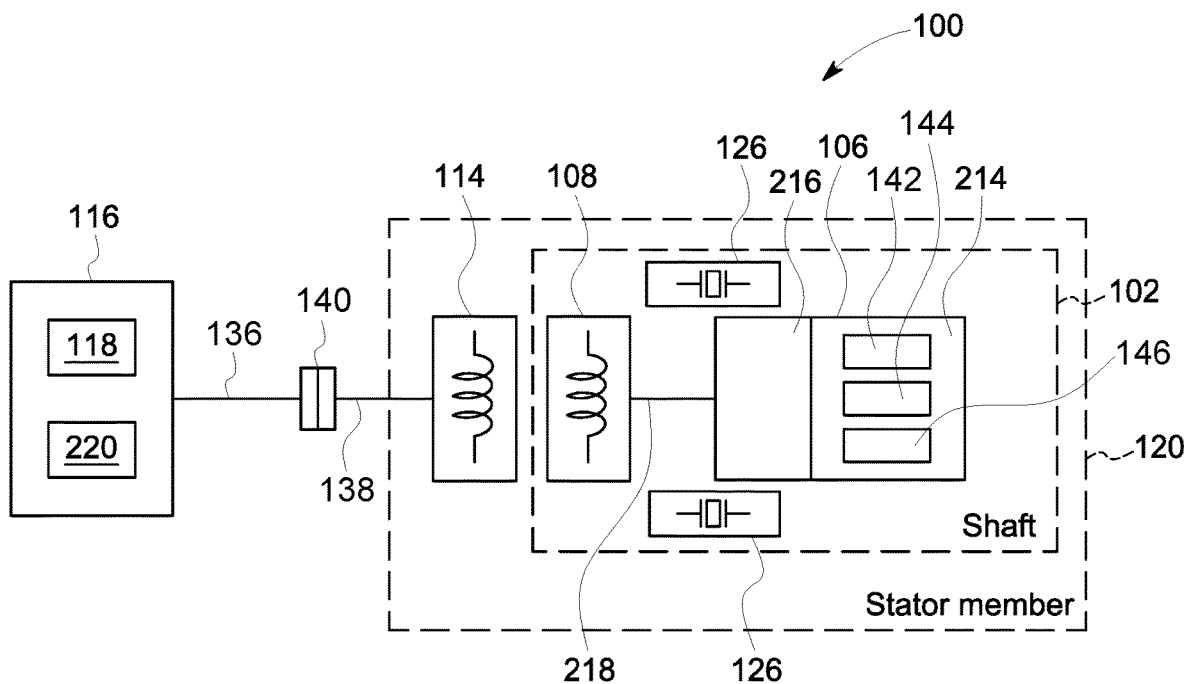
FIG. 2 is a block diagram of the sensor system according to an embodiment.

FIG. 2 is a block diagram of the sensor system 100 according to an embodiment. Optionally, the controller 116 may be remote from stator member 120 on which the stator antenna 114 is mounted. The controller 116 may be conductively connected to the stator antenna 114 by a first wire path 136 and a second wire path 138. Each of the wire paths 136, 138 may include or represent one or more wires, cables, optical fibers, or the like. The wire paths 136, 138 may be separably connected via a connector assembly 140. The first wire path 136 extends from the controller 116 to the connector assembly 140, and the second wire path 138 extends from the connector assembly 140 to the stator antenna 114. The rotor antenna 108 may be conductively connected to the RF sensor 106 via a conductive signal path 218 along the shaft 102, which may be provided by one or more wires. Optionally, the rotor antenna 108 is directly connected to a portion of the RF sensor 106, such as a printed circuit board 216 or substrate of the RF sensor 106, without a discrete wire traversing a space between the antenna 108 and the RF sensor 106.

The RF sensor 106 in the illustrated embodiment is a SAW sensor. The RF sensor 106 may be an all-quartz-package SAW sensor. For example, the sensor 106 may be sealed between a quartz substrate and a second quartz layer. The SAW sensor 106 may include a first resonator 142, a second resonator 144, and a third resonator 146. The resonators 142, 144, 146 may be disposed on a common substrate 214. The substrate 214 may include quartz. The substrate 214 may be affixed to the shaft 102 via an adhesive that is applied on an inner surface of the substrate 214 that faces the shaft 102. The SAW sensor 106 optionally includes the circuit board 216 that includes, or is connected to, the substrate 214. The location of the RF sensor 106 on the shaft 102 provides for direct measurement of one or more properties, such as strain and temperature, via the resonators 142, 144, 146. For example, the first and second resonators 142, 144 may measure strain, and the third resonator 146 may measure temperature. The strain measurements can be used to derive torque. Optionally, the strain resonators 142, 144, 146 may be configured to resonate at different frequencies.

In an embodiment, the SAW sensor 106 is passive and is powered by receiving stimulus signals. Each stimulus signal transmitted via the antennas 108, 114 to the SAW sensor 106 may have a broad frequency spectrum. The spectrum of the stimulus signal may define an operating frequency range of the SAW sensor 106. The SAW sensor 106 converts the electrical stimulus signals into acoustic signals that travel along the surface of the shaft 102. The measurement signals generated by the SAW sensor 106 may include the broad spectrum of the stimulus signal with nulls or voids in the spectrum that represent the frequencies at which the resonators 142, 144, 146 resonate. The controller 116 receives the measurement signals from the stator antenna 114 and can determine the resonating frequencies of the resonators 142, 144, 146 based on these nulls in the spectrum. The controller 116 is configured to determine one or more properties of the shaft 102, such as strain, torque, temperature, or the like, based on the determined resonating frequencies of the resonators 142, 144, 146.

The FS structures 126 on the shaft 102 are configured to absorb and dissipate surface currents along the shaft 102 that are within the operating frequency range of the SAW sensor 106 to reduce masking the measurement signals generated by the sensor 106. In a non-limiting example, the operating frequency range may be a range from about 430 MHz to about 450 MHz, such that the frequency spectrum of the stimulus signals and the frequency spectrum of the returning measurement signals are both within this range. The FS structures 126 may be specifically constructed such that the resonant elements 128 resonate at frequency bands encompassing the operating frequency range to dissipate extraneous RF energy that could interfere with the transmission and/or interpretation of the measurement signals. For example, without the FS structures 126, extraneous RF energy in the operating frequency range would decrease the signal-to-noise ratio by masking the nulls or voids in the frequency spectrum of the measurement signals that indicate the frequencies at which the resonators 142, 144, 146 resonate. As a result of the masking, the controller 116 may not be able to decipher the nulls or voids in the spectrum as accurately or precisely. Thus, without the FS structures 126, this electromagnetic interference can reduce the accuracy of the measurements or even render the sensor system inoperable.

In a non-limiting example, the FS structures 126 may include a first subset of the resonant elements 128 may be designed to resonate at a frequency band from about 430 MHz to about 435 MHz; a second subset of the resonant elements 128 may be designed to resonate at a frequency band from about 435 MHz to about 440 MHz; a third subset of the resonant elements 128 may be designed to resonate at a frequency band from about 440 MHz to about 445 MHz; and a fourth subset of the resonant elements 128 may be designed to resonate at a frequency band from about 445 MHz to about 450 MHz. The resonant elements 128 of the different subsets may have different characteristics, such as size, geometry, material composition, and/or the like, to enable resonating at the different frequency bands. Therefore, surface currents at a frequency of 444 MHz would get absorbed and dissipated by the resonant elements 128 in the third subset. By dissipating at least some of the extraneous RF energy within the operating frequency range, the controller 116 may be able to more accurately and precisely decipher the nulls or voids in the frequency spectrum of the measurement signals indicative of the resonating frequencies of the resonators 142, 144, 146, yielding more accurate determinations of the properties of the shaft 102. In another non-limiting example, instead of having subsets of resonant elements 128 constructed to absorb and dissipate energy at different frequency bands, the operating frequency range of the sensor 106 may be sufficiently narrow such that each of the resonant elements 128 is able to absorb and dissipate energy throughout the entire operating frequency range. Therefore, all of the resonant elements 128 may have the same characteristics, such as size, geometry, material composition, and/or the like.

The controller 116 includes one or more processors 118. The one or more processors 118 may include or represent a microprocessor, a digital signal processor (DSP), an application specific integrated circuit (ASIC), a field programmable gate array (FPGA), or other programmable logic device, discrete gate or transistor logic, discrete hardware components, or any combination thereof designed and programmed to perform or cause the performance of the functions described herein. The controller 116 may include a local memory storage device 220 operably connected to the one or more processors 118. The local memory storage device 220 includes a computer readable medium, such as a random-access memory (RAM), a computer readable non-volatile medium (e.g., flash memory, EEPROM, NVRAM, FRAM), or the like. The memory 220 can store information that is accessible to the one or more processors 118. The information may include instructions (e.g., software) that can be executed by the one or more processors 118 to perform or cause the performance of the functions described herein.

Optionally, the memory 220 may store calibration information can be utilized by the one or more processors 118 to determine one or more properties of the shaft 102. The calibration information can provide a known or estimated relationship between the measured value and an actual, or more accurate, value. For example, the one or more processors 118 may be configured to utilize the calibration information with the determined resonating frequencies of the first and second resonators 142, 144 to derive a torque through the shaft 102. Furthermore, the processors 118 may utilize the calibration information with the determined resonating frequency of the third resonator 146 to derive a temperature of the shaft 102.

Although the RF sensor 106 is described herein as a SAW sensor, such as an all-quartz package SAW sensor, in an alternative embodiment the RF sensor 106 may be different type of sensor, such as a strain gauge, temperature sensor (e.g., a thermocouple), an accelerometer, a speed sensor, or the like. The sensor system 100 described herein is not limited to SAW sensors.

Figure 3:
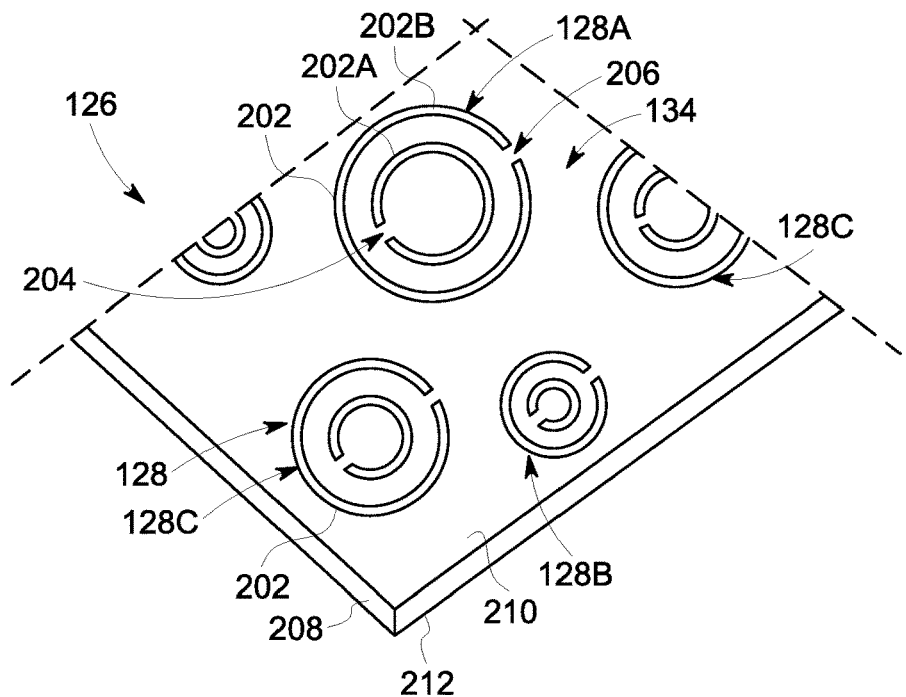
FIG. 3 is a close-up perspective view of a portion of a frequency selective structure of the sensor system according to an embodiment.

FIG. 3 is a close-up perspective view of a portion of one of the FS structures 126 of the sensor system 100 according to an embodiment. The FS structure 126 in FIG. 3 includes a repeating array 134 or pattern of multiple resonant elements 128. Each resonant element 128 includes multiple conductive features 202 formed in a specific geometrical shape. In the illustrated embodiment, each resonant element 128 includes an inner feature 202A and an outer feature 202B. The inner feature 202A is disposed within and is concentric with the outer feature 202B. The inner feature 202A may be insulated from the outer feature 202B such that the inner feature 202A does not intersect or directly connect to the outer feature 202B. The inner features 202A and the outer features 202B are formed into split rings in FIG. 3. Each resonant element 128 may be a split ring resonator. Each of the inner and outer split rings 202A, 202B has a respective gap 204, 206. The gap 204 of the inner ring 202A is disposed at an opposite circumferential position as the gap 206 of the outer ring 202B. Although the resonant elements 128 are shown as split rings in FIG. 3, the resonant elements 128 may have other geometries in other embodiments. For example, at least some of the resonant elements 128 may be split polygons (e.g., squares, rectangles, or the like), spiral-shaped, or the like.

The resonant elements 128 are self-resonant structures. For example, characteristics of the elements 128 such as the size, geometry, material composition, and the like, provide the elements 128 with inherent inductance and capacitance that allows each element 128 to resonate at a certain frequency band (or range). The array 134 may include resonant elements 128 having different characteristics to resonate at different frequency bands, allowing the FS structure 126 to absorb and dissipate extraneous RF energy within a broader frequency range than a single one of the frequency bands. In the illustrated embodiment, the resonant elements 128 have multiple different sizes, such as large elements 128A, small elements 128B, and medium-sized elements 128C. The different sizes may cause the large elements 128A to resonate at a different specific frequency band than the respective frequency bands of the small and medium-sized elements 128B, 128C. In FIG. 3, all of the resonant elements 128 have the same split-ring geometry, but optionally, at least some of the resonant elements 128 in the array 134 may have different geometries in addition to (or instead of) having different sizes. The geometry represents another variable along with size than can be varied to provide a specific resonating frequency band based on application-specific needs (e.g., the operating frequency range of the RF sensor 106).

The FS structure 126 in FIG. 3 includes a dielectric substrate 208 and the conductive features 202 of the resonant elements 128 disposed on the dielectric substrate 208. The conductive features 202 may be metal or metallized traces, such as metallized polyimide. The conductive features 202 may be mounted along a top or outer surface 210 of the dielectric substrate 208. For example, the conductive features 202 may be printed directly onto the outer surface 210 of the substrate 208. The substrate 208 may be relatively thin and flexible to allow the FS structure 126 to conform to the curved outer surface 110 of the shaft 102. The FS structure 126 may be mounted to the shaft 102 via an adhesive, such that the FS structure 126 is bonded to the outer surface 110. For example, an adhesive may be applied to an inner surface 212 of the substrate 208 (opposite the outer surface 210). Then, the FS structure 126 may be pressed onto to outer surface 110 of the shaft 102. The adhesive optionally may be a pressure-sensitive adhesive that is activated by the presence of high pressure. Thus, the FS structure 126 optionally may be a peel and stick decal or sticker that is affixed to the shaft 102 via an adhesive. For example, the FS structure 126 may be printed in a roll or panel, and then cut to size and applied to the shaft 102 or another structure via the adhesive backing.

In an alternative embodiment, the FS structure 126 may be formed in-situ on the shaft 102. For example, a printing device may be used to form the conductive features 202 of the resonant elements 128 directly on the outer surface 110 of the shaft 102. The FS structure 126 may be formed via an additive manufacturing process that prints both the dielectric portions and the conductive elements (e.g., the features 202). In another example, both the shaft 102 and the one or more FS structures 126 thereon may be formed during a common additive printing process that applies fuses material together in layers.

Figure 4:
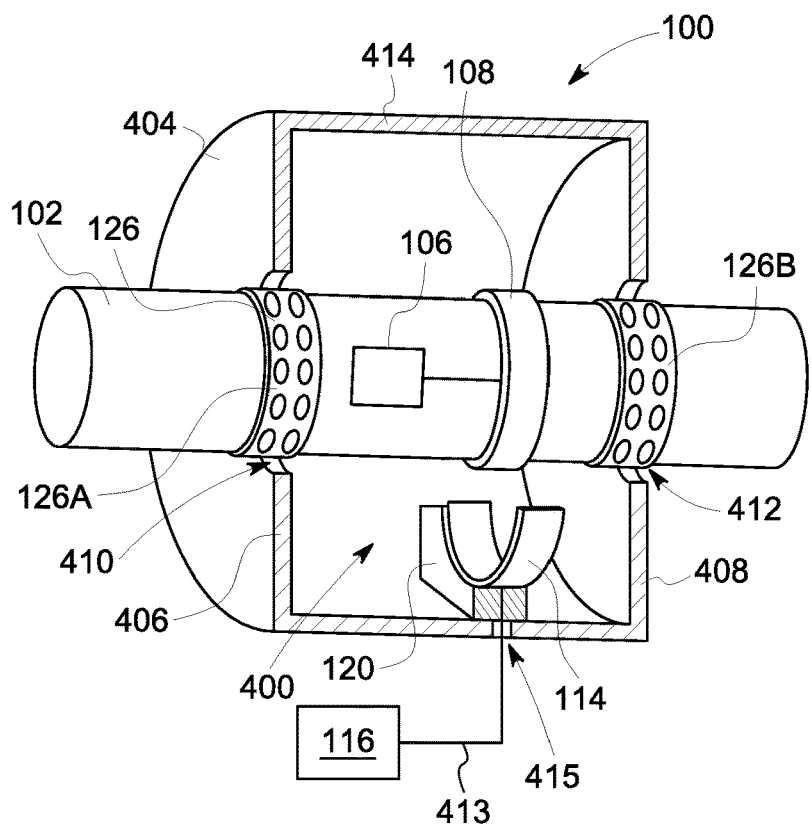
FIG. 4 illustrates a cross-sectional perspective view of the sensor system incorporated with a rotor assembly according to an embodiment.

FIG. 4 illustrates a cross-sectional perspective view of the sensor system 100 incorporated with a rotor assembly 400 according to an embodiment. The rotor assembly 400 includes the shaft 102 and the stator member 120. The shaft 102 rotates or spins relative to the stator member 120. The stator antenna 114 is mounted on the stator member 120. In the illustrated embodiment, the sensor system 100 also includes an enclosure 404. FIG. 4 is illustrated such that the enclosure 404 and the stator member 120 are the only components shown in cross-section. The stator antenna 114 surrounds at least a portion of the circumference of the shaft 102. The rotor antenna 108 extends around at least a portion of the circumference of the shaft 102. In a non-limiting example, the rotor antenna 108 is an annular ring that extends around a fully circumference of the shaft 102, and the stator antenna 114 is an arc that surrounds a circumferential portion of the shaft 102 less than the full circumference.

The enclosure 404 surrounds multiple components of the sensor system 100 including at least the RF sensor 106, the rotor antenna 108, and the stator antenna 114. The enclosure 404 may be electrically conductive. For example, the enclosure 404 may be composed of one or more metals. The enclosure 404 may function as a Faraday cage that blocks electromagnetic energy from penetrating the enclosure 404. For example, the enclosure 404 may block radiated RF energy outside of the enclosure 404 from entering the enclosure 404 and interfering with the operations of the sensor system 100. The enclosure 404 includes a first side wall 406 and a second side wall 408. Each of the first and second side walls 406, 408 defines a respective opening 410, 412 therethrough. The openings 410, 412 are sized and positioned to accommodate the shaft 102. For example, the shaft 102 protrudes through the enclosure 404 via the openings 410, 412. The openings 410, 412 are sized larger than the diameter of the shaft 102 to avoid direct physical contact between the shaft 102 and the walls 406, 408, which could undesirably wear the components and/or generate excessive heat. The enclosure 404 in the illustrated embodiment includes a cylindrical shell 414 that extends from the first side wall 406 to the second side wall 408. The stator member 120 optionally may be mounted to the cylindrical shell 414 within the enclosure 404. For example, the stator member 120 may be a bracket or frame that is coupled to the shell 414. In an alternative embodiment, the enclosure 404 may have other than a cylindrical shape, such as a parallelepiped (e.g., prism) shape. The stator member 120 may be conductively connected to the controller 116 outside of the enclosure 404 via a wire 413 that extends through a port 415 in the enclosure 404. The port 415 extends through the shell 414 in the illustrated embodiment.

The rotor antenna 108 may include at least one unshielded transmission line. Each unshielded transmission line may be a coil of wire, a conductive trace embedded or printed on a substrate, or the like. Optionally, the rotor antenna 108 may include multiple unshielded transmission lines differential or microstrip coupling, with one line serving as a signal line and another line serving as a return line. The unshielded transmission lines may be composed of a metal material, such as copper, nickel, and alloys thereof. The unshielded transmission lines may be secured to the shaft 102 via a dielectric substrate of the rotor antenna 108. The dielectric substrate may be fixed in place on the shaft 102 via an adhesive or friction.

Similar to the rotor antenna 108, the stator antenna 114 may include at least one unshielded transmission line that is a coil of wire, a conductive trace embedded or printed on a substrate, or the like. The stator antenna 114 optionally may include multiple transmission lines including at least one signal line and at least one return line for differential or microstrip coupling. The unshielded transmission lines may be secured directly to an inner surface of the stator member 120 or indirectly secured to the stator member 120 via a dielectric substrate of the stator antenna 114.

The enclosure 404 may shield the components of the sensor system 100 within the enclosure 404 from radiated RF energy, but the openings 410, 412 in the side walls 406, 408, respectively, may permit access to the interior of the enclosure 404 for surface currents conducted along the length of the shaft 102 and/or along outer surfaces of the enclosure 404. In the illustrated embodiment, the FS structures 126 are disposed on the shaft 102 at or proximate to the openings 410, 412 to absorb and dissipate these surface currents. For example, the first FS structure 126A is disposed at or proximate to the opening 410 in the first side wall 406, and the second FS structure 126B is at or proximate to the opening 412 in the second side wall 408. In the illustrated embodiment, the FS structures 126A, 126B align with the corresponding side walls 406, 408. For example, the position of the first FS structure 126A along the length of the shaft 102 overlaps the position of the first side wall 406, such that the first FS structure 126A extends at least partially across the opening 410. Similarly, the position of the second FS structure 126B along the length of the shaft 102 overlaps the position of the second side wall 408, such that the second FS structure 126B extends at least partially across the opening 412. The FS structures 126A, 126B may be wider than the side walls 406, 408 along the length of the shaft 102 such that a portion of each of the FS structures 126A, 126B projects into the enclosure 404 and/or outside of the enclosure 404. The FS structures 126A, 126B are configured to absorb and dissipate specific frequency bands of extraneous surface currents conducted along the shaft 102 to prevent or at least prohibit the surface currents from masking or otherwise interfering with the operations of the sensor system 100. The FS structures 126A, 126B may also prohibit surface currents in the specific frequency bands from exiting the enclosure 404, thereby reducing interference with other, external devices outside of the enclosure 404. Although the FS structures 126A, 126B align with the corresponding side walls 406, 408 in the illustrated embodiment, in a first alternative embodiment the FS structures 126A, 126B may both be located entirely within the enclosure 404. In a second alternative embodiment, the FS structures 126A, 126B may both be located entirely outside of the enclosure 404.

Optionally, the FS structures 126A, 126B may each annularly extend around a full circumference of the shaft 102. For example, although only a portion of the circumference of the shaft 102 is visible in FIG. 4, the FS structures 126A, 126B may wrap around the entire circumference. As a result, any surface currents conducted axially along the shaft 102 towards the rotor antenna 108 and the RF sensor 106 traverse through at least one of the FS structures 126A, 126B. Alternatively, each FS structure 126 may extend around only a portion of the circumference of the shaft 102. Optionally, multiple FS structures 126 may be disposed along different circumferential portions such that, in combination, the FS structures 126 extend around the entire circumference.

Figure 5:
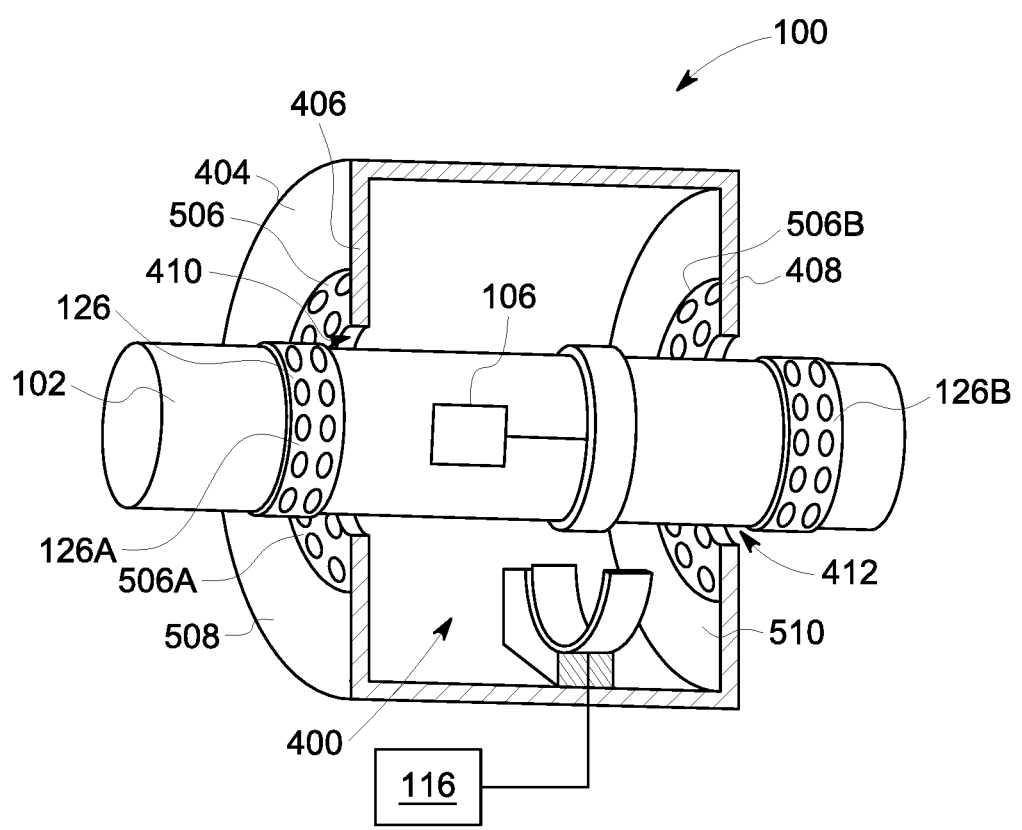
FIG. 5 illustrates a cross-sectional perspective view of the sensor system incorporated with the rotor assembly according to another embodiment.

FIG. 5 illustrates a cross-sectional perspective view of the sensor system 100 incorporated with the rotor assembly 400 according to another embodiment. In FIG. 5, the first and second FS structures 126A, 126B are disposed on the shaft 102 outside of the enclosure 404. For example, the FS structures 126A, 126B are axially spaced apart from the first and second side walls 406, 408. The energy of the surface currents absorbed by the FS structures 126A,126B may be dissipated as heat. Because the FS structures 126A, 126B are outside of the enclosure 404, the heat may be dissipated into the ambient environment without affecting the temperature inside the enclosure 404.

Optionally, the FS structures 126A, 126B on the shaft 102 represent a shaft-mounted set 502 of FS structures, and the sensor system 100 may also include an enclosure-mounted set 504 of FS structures 506. The enclosure-mounted set 504 includes one or more FS structures 506 disposed on one or more surfaces of the enclosure 404. In the illustrated embodiment, the enclosure-mounted set 504 includes at least a first FS structure 506A disposed on an exterior surface 508 of the first side wall 406 and a second FS structure 506B disposed on an interior surface 510 of the second side wall 408. The interior surface 510 faces into the interior of the enclosure 404, and the exterior surface 508 faces out away from the interior of the enclosure 404. Although not shown, the enclosure-mounted set 504 may include FS structures 506 disposed on an interior surface of the first side wall 406 and/or on an exterior surface of the second side wall 408. The FS structures 506 on the enclosure 404 may be similar in design and function as the FS structures 126. For example, the FS structures 506 may be configured to resonate at certain specific frequency bands within the operating frequency range of the RF sensor 106 to absorb and dissipate surface currents along the enclosure 404 that have entered, or could enter, the enclosure 404 through the openings 410, 412 and mask the measurement signals.

Figure 6:
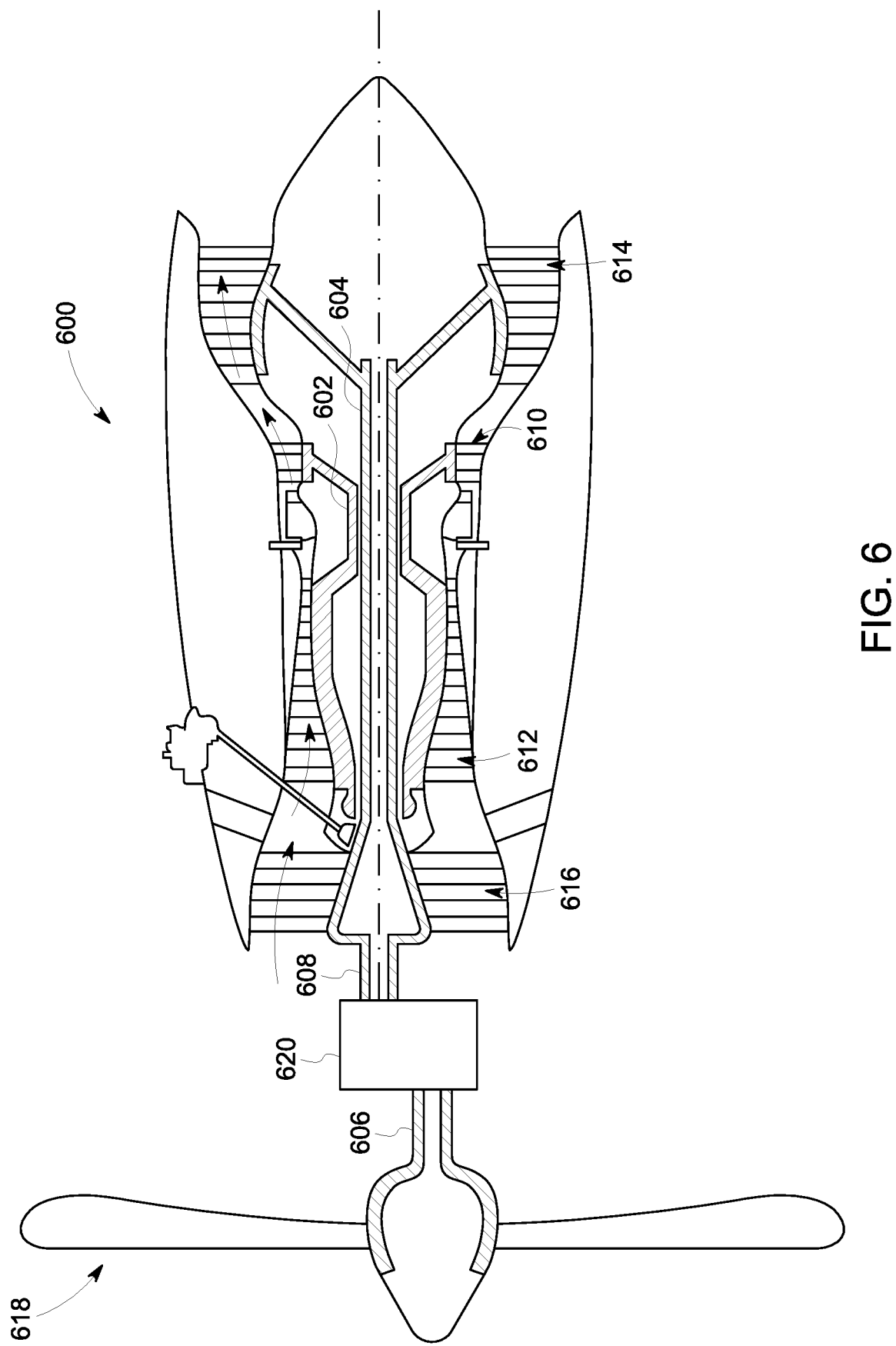
FIG. 6 is a schematic cross-sectional view of a power-generating machine according to an embodiment.

FIG. 6 is a schematic cross-sectional view of a power-generating machine 600 according to an embodiment. The power-generating machine 600 is a combustion engine. In a non-limiting example, the engine may be a high bypass turboprop type engine. The engine in other non-limiting examples may include or represent other turbine-powered engines, such as a turboshaft engine, a turbofan engine, or the like. The sensor system 100 shown in FIGS. 1 through 5 may be incorporated into the power-generating machine 600. For example, the machine 600 includes various rotating shafts, such as a high-pressure shaft 602, a low-pressure shaft 604, a fan shaft 606, and an engine coupling shaft 608. The high-pressure shaft 602 connects a high-pressure turbine 610 to a high-pressure compressor 612. The lower pressure shaft 604 connects a low-pressure turbine 614 to a low-pressure compressor 616. The fan shaft 606 connects to a fan section or propeller 618. The engine coupling shaft 608 connects a speed reduction device 620 to the low-pressure shaft 604. These shafts 602, 604, 606, 608 may represent different rotor assemblies or different components of a single rotor assembly.

The sensor system 100 may be incorporated with at least one of these shafts 602, 604, 606, 608 to monitor properties of the shafts such as, but not limited to, strain, torque, temperature, or rotational speed. The controller 116 may be configured to control the operation of the power-generating machine 600 based on one or more determined properties of the shaft 102. For example, the power-generating machine 600 may have a designated torque value or range. If the sensor system 100 determines a torque value for the shaft 102 that is outside of the torque range, the controller 116 may generate a control signal configured to change an operating setting of the power-generating machine 600, such as to increase the power output of the machine 600 or to decrease the power output based on the determined torque value.

Although the power-generating machine 600 shown in FIG. 6 is a combustion engine, the sensor system 100 described herein may be incorporated with other types of machines that include rotor assemblies (e.g., rotating shafts). Such machines may include motors, generators, other types of engines, and the like.

Figure 7:
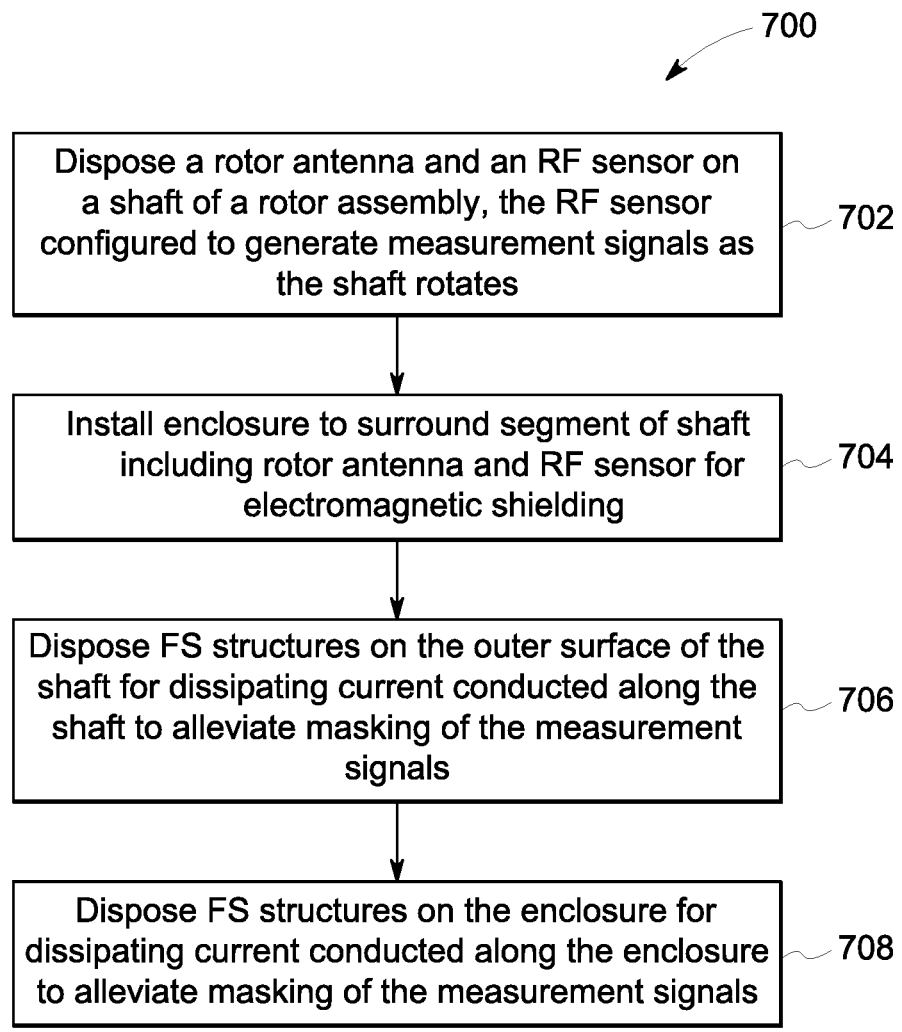
FIG. 7 is a flow chart for a method of installing a sensor system on a rotor assembly according to an embodiment.

FIG. 7 is a flow chart for a method 700 of installing a sensor system on a rotor assembly, according to an embodiment. The method 700 may be performed to install the sensor system 100 described with reference to FIGS. 1 through 6. Optionally, the method 700 may include additional steps not shown in FIG. 7, fewer steps than shown in FIG. 7, different steps than shown in FIG. 7, and/or the steps may be performed in a different order than shown in FIG. 7.

At 702, a rotor antenna 108 and a radio frequency (RF) sensor 106 are disposed (e.g., installed or mounted) on an outer surface 110 of a shaft 102 that is configured to rotate about a center axis 112 of the shaft 102. The RF sensor 106 is conductively connected to the rotor antenna 108 and configured to generate measurement signals as the shaft 102 rotates. The RF sensor 106 may be a passive, SAW sensor. The rotor antenna 108 may transmit the measurement signals across an air gap 122 to a stator antenna 114 that is positioned radially outward from the rotor antenna 108.

At 704, an enclosure 404 may be installed around a segment of the shaft 102 to surround at least the rotor antenna 108, the RF sensor 106, and the stator antenna 114. The enclosure 404 may be electrically conductive to provide electromagnetic shielding. The enclosure 404 may include first and second side walls 406, 408 that define respective openings 410, 412 through which the shaft 102 protrudes.

At 706, one or more frequency selective (FS) structures 126 may be disposed on the outer surface 110 of the shaft 102. The FS structures 126 may absorb and dissipate electromagnetic current conducted along the shaft 102 to alleviate masking of the measurement signals by the electromagnetic current. Each of the FS structures 126 may include a dielectric substrate 208 and a conductive element 128 disposed on the dielectric substrate 208. The FS structures 126 may be affixed to the outer surface 110 of the shaft 102 by applying an adhesive to the inner surface 212 of the dielectric substrate 208 and subsequently pressing the inner surface 212 against the outer surface 110 of the shaft 102 such that the adhesive bonds the FS structure to the shaft 102. Alternatively, the FS structures 126 may be formed in-situ on the shaft 102.

At 708, one or more frequency selective (FS) structures 506 may be disposed on the enclosure 404 for dissipating current conducted along the enclosure to alleviate masking of the measurement signals. The FS structures 506 may have similar constructions and/or functions as the FS structures 126 on the shaft 102.

At least one technical effect of the embodiments described herein includes the ability to electromagnetically shield a sensor system that is incorporated onto a rotating shaft. For example, the FS structures may dampen and dissipate extraneous RF energy that is radiated through the air or conducted along the surface of the shaft and/or the enclosure. The FS structures may be able to be tuned to dissipate specific frequency bands of interest, which are frequency bands within the operating frequency range of the sensor system. By absorbing and dissipating these specific frequency bands, the sensor system experiences improved RF isolation and EMI susceptibility relative to known conventional shaft-mounted sensors. Another technical effect is the ability to utilize a single sensor system or platform to determine multiple different properties of a rotating shaft including, for example, strain, torque, and temperature. Another technical effect is the ability to simply and efficiently incorporate the sensor system into a rotor assembly that is not specifically designed for accommodating sensors. For example, the sensor system described herein may include narrow, lightweight, passive components that are mounted on the shaft, such that the components do not obstruct or otherwise interfere with the operation of the rotor assembly. Furthermore, the sensor system can be utilized in harsh environments such as within power-generating prime movers, such as engines, motors, generators, and the like.

In one or more embodiments, a sensor system is provided that includes a rotor antenna, a radio frequency (RF) sensor, a stator antenna, and one or more frequency selective structures. The rotor antenna is disposed on an outer surface of a shaft configured to rotate about a center axis of the shaft. The RF sensor is disposed on the outer surface of the shaft and conductively connected to the rotor antenna. The RF sensor is configured to generate measurement signals as the shaft rotates. The stator antenna is mounted separate from the shaft such that the rotor antenna and the RF sensor rotate with the shaft relative to the stator antenna. The stator antenna is positioned radially outward from the rotor antenna and wirelessly connected to the rotor antenna across an air gap to receive the measurement signals from the rotor antenna. The one or more frequency selective structures are disposed on the outer surface of the shaft and configured to dissipate electromagnetic current that is conducted along the shaft to alleviate interference of the measurement signals.

Optionally, the one or more frequency selective structures include resonant elements configured to resonate at select frequency bands. The select frequency bands encompass an operating frequency range of the RF sensor.

Optionally, the one or more frequency selective structures on the shaft include a first frequency selective structure and a second frequency selective structure. The rotor antenna and the RF sensor are axially disposed between the first frequency selective structure and the second frequency selective structure along a length of the shaft.

Optionally, each of the one or more frequency selective structures includes multiple resonant elements spaced apart from one another and arranged in a two-dimensional array. The array circumferentially extends along the outer surface of the shaft. Optionally, at least some of the resonant elements in a corresponding array have a different size and/or a different geometry to resonate at different select frequency bands.

Optionally, each of the one or more frequency selective structures includes a dielectric substrate and at least one resonant element disposed on the dielectric substrate. An inner side of the dielectric substrate is affixed to the outer surface of the shaft via an adhesive.

Optionally, each of the one or more frequency selective structures includes at least one resonant element. Each resonant element includes multiple conductive features insulated from each other and arranged in a geometrical shape.

Optionally, each of the one or more frequency selective structures annularly extends around a full circumference of the shaft.

Optionally, the RF sensor is an all-quartz package surface acoustic wave sensor.

Optionally, the RF sensor is a surface acoustic wave sensor that includes multiple resonators configured to resonate at respective frequencies within an operating frequency range of the RF sensor. The one or more frequency selective structures include resonant elements configured to resonate at select frequency bands to dissipate electromagnetic current at the select frequency bands. The select frequency bands, at which the resonant elements resonate, encompass the operating frequency range of the RF sensor.

Optionally, the sensor system further includes an enclosure surrounding at least the rotor antenna, the RF sensor, and the stator antenna. The enclosure is electrically conductive and including first and second side walls that define respective openings through which the shaft protrudes. The one or more frequency selective structures are disposed on the shaft at or proximate to the openings in the first and second side walls. Optionally, the one or more frequency selective structures on the shaft represent a shaft-mounted set of one or more frequency selective structures. The sensor system further includes an enclosure-mounted set of one or more frequency selective structures disposed on one or more surfaces of the enclosure.

Optionally, the sensor system further includes a controller communicatively connected to the stator antenna. The controller is configured to monitor the measurement signals received from the stator antenna to determine one or more properties of the shaft.

In one or more embodiments, a sensor system is provided that includes a rotor antenna, a radio frequency (RF) sensor, a stator antenna, an enclosure, and one or more frequency selective structures. The rotor antenna is disposed on an outer surface of a shaft configured to rotate about a center axis of the shaft. The RF sensor is disposed on the outer surface of the shaft and is conductively connected to the rotor antenna. The RF sensor is configured to generate measurement signals as the shaft rotates. The stator antenna is mounted separate from the shaft such that the rotor antenna and the RF sensor rotate with the shaft relative to the stator antenna. The stator antenna is positioned radially outward from the rotor antenna and wirelessly connected to the rotor antenna across an air gap to receive the measurement signals from the rotor antenna. The enclosure surrounds at least the rotor antenna, the RF sensor, and the stator antenna. The enclosure is electrically conductive and includes first and second side walls that define respective openings through which the shaft protrudes. The one or more frequency selective structures are disposed on the outer surface of the shaft and are configured to dissipate electromagnetic current that is conducted along the shaft to alleviate interference of the measurement signals.

Optionally, the one or more frequency selective structures include a first frequency selective structure disposed on the shaft at or proximate to the opening in the first side wall and a second frequency selective structure disposed on the shaft at or proximate to the opening in the second side wall. The rotor antenna and the RF sensor are axially located between the first and second frequency selective structures.

Optionally, at least one of the one or more frequency selective structures is disposed on the shaft outside of the enclosure.

Optionally, the one or more frequency selective structures on the shaft represent a shaft-mounted set of one or more frequency selective structures. The sensor system further includes an enclosure-mounted set of one or more frequency selective structures disposed on one or more surfaces of the enclosure.

Optionally, the RF sensor is a surface acoustic wave sensor that includes multiple resonators configured to resonate at respective frequencies within an operating frequency range of the RF sensor. The one or more frequency selective structures include resonant elements configured to resonate at select frequency bands to dissipate electromagnetic current at the select frequency bands. The select frequency bands, at which the resonant elements resonate, encompass the operating frequency range of the RF sensor.

In one or more embodiments, a method (e.g., for installing a sensor system on a rotor assembly) is provided that includes disposing a rotor antenna and a radio frequency (RF) sensor on an outer surface of a shaft configured to rotate about a center axis of the shaft. The RF sensor is conductively connected to the rotor antenna and configured to generate measurement signals as the shaft rotates. The rotor antenna is configured to transmit the measurement signals across an air gap to a stator antenna that is positioned radially outward from the rotor antenna. The method also includes disposing one or more frequency selective structures on the outer surface of the shaft. The one or more frequency selective structures are configured to dissipate electromagnetic current conducted along the shaft to alleviate interference of the measurement signals.

Optionally, the method also includes installing an enclosure to surround at least the rotor antenna, the RF sensor, and the stator antenna. The enclosure is electrically conductive and includes first and second side walls that define respective openings through which the shaft protrudes.

Optionally, each of the one or more frequency selective structures includes a dielectric substrate and a conductive element disposed on the dielectric substrate. The one or more frequency selective structures are disposed on the outer surface of the shaft by applying an adhesive to an inner side of the dielectric substrate and subsequently pressing the inner side of the dielectric substrate against the outer surface such that the adhesive bonds the frequency selective structure to the shaft.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system comprising:
a rotor antenna disposed on an outer surface of a shaft configured to rotate about a center axis of the shaft;
a radio frequency (RF) sensor disposed on the outer surface of the shaft and conductively connected to the rotor antenna, the RF sensor configured to generate measurement signals as the shaft rotates;
a stator antenna mounted separate from the shaft such that the rotor antenna and the RF sensor rotate with the shaft relative to the stator antenna, the stator antenna wirelessly connected to the rotor antenna across an air gap to receive the measurement signals from the rotor antenna; and
first and second frequency selective structures disposed on the outer surface of the shaft and configured to dissipate electromagnetic current that is conducted along the shaft to alleviate interference of the measurement signals, wherein the rotor antenna and the RF sensor axially disposed between the first frequency selective structure and the second frequency selective structure along a length of the shaft.

2. The sensor system of claim 1, wherein the first and second frequency selective structures include resonant elements configured to resonate at select frequency bands, the select frequency bands encompassing an operating frequency range of the RF sensor.

3. The sensor system of claim 1, wherein each of the first and second frequency selective structures includes multiple resonant elements spaced apart from one another and arranged in a two-dimensional array, the array circumferentially extending along the outer surface of the shaft.

4. The sensor system of claim 3, wherein at least some of the resonant elements in a corresponding array have one or more of a different size or a different geometry to resonate at different select frequency bands.

5. The sensor system of claim 1, wherein each of the first and second frequency selective structures includes a dielectric substrate and at least one resonant element disposed on the dielectric substrate, wherein an inner surface of the dielectric substrate is affixed to the outer surface of the shaft via an adhesive.

6. The sensor system of claim 1, wherein each of the first and second frequency selective structures includes at least one resonant element, each resonant element including multiple conductive features insulated from each other and arranged in a geometrical shape.

7. The sensor system of claim 1, wherein each of the first and second frequency selective structures annularly extends around a full circumference of the shaft.

8. The sensor system of claim 1, wherein the RF sensor is an all-quartz package surface acoustic wave sensor.

9. The sensor system of claim 1, wherein the RF sensor is a surface acoustic wave sensor that includes multiple resonators configured to resonate at respective frequencies within an operating frequency range of the RF sensor, the first and second frequency selective structures including resonant elements configured to resonate at select frequency bands to dissipate electromagnetic current at the select frequency bands, wherein the select frequency bands at which the resonant elements resonate encompass the operating frequency range of the RF sensor.

10. The sensor system of claim 1, further comprising an enclosure surrounding at least the rotor antenna, the RF sensor, and the stator antenna, the enclosure being electrically conductive and including first and second side walls that define respective openings through which the shaft protrudes, wherein the first and second frequency selective structures are disposed on the shaft at or proximate to the openings in the first and second side walls.

11. The sensor system of claim 10, wherein the first and second frequency selective structures on the shaft represent a shaft-mounted set of frequency selective structures, and the sensor system further includes an enclosure-mounted set of one or more frequency selective structures disposed on one or more surfaces of the enclosure.

12. The sensor system of claim 1, further comprising a controller communicatively connected to the stator antenna, the controller configured to monitor the measurement signals received from the stator antenna to determine one or more properties of the shaft.

13. A sensor system comprising:
a rotor antenna disposed on an outer surface of a shaft configured to rotate about a center axis of the shaft;
a radio frequency (RF) sensor disposed on the outer surface of the shaft and conductively connected to the rotor antenna, the RF sensor configured to generate measurement signals as the shaft rotates;
a stator antenna mounted separate from the shaft such that the rotor antenna and the RF sensor rotate with the shaft relative to the stator antenna, the stator antenna positioned radially outward from the rotor antenna and wirelessly connected to the rotor antenna across an air gap to receive the measurement signals from the rotor antenna;
an enclosure surrounding at least the rotor antenna, the RF sensor, and the stator antenna, the enclosure being electrically conductive and including first and second side walls that define respective openings through which the shaft protrudes; and
one or more frequency selective structures disposed on the outer surface of the shaft and configured to dissipate electromagnetic current that is conducted along the shaft to alleviate interference of the measurement signals.

14. The sensor system of claim 13, wherein the one or more frequency selective structures include a first frequency selective structure disposed on the shaft at or proximate to the opening in the first side wall and a second frequency selective structure disposed on the shaft at or proximate to the opening in the second side wall, the rotor antenna and the RF sensor axially located between the first and second frequency selective structures.

15. The sensor system of claim 13, wherein at least one of the one or more frequency selective structures is disposed on the shaft outside of the enclosure.

16. The sensor system of claim 13, wherein the one or more frequency selective structures on the shaft represent a shaft-mounted set of one or more frequency selective structures, and the sensor system further includes an enclosure-mounted set of one or more frequency selective structures disposed on one or more surfaces of the enclosure.

17. The sensor system of claim 13, wherein the RF sensor is a surface acoustic wave sensor that includes multiple resonators configured to resonate at respective frequencies within an operating frequency range of the RF sensor, the one or more frequency selective structures including resonant elements configured to resonate at select frequency bands to dissipate electromagnetic current at the select frequency bands, wherein the select frequency bands at which the resonant elements resonate encompass the operating frequency range of the RF sensor.

18. The sensor system of claim 13, wherein each of the one or more frequency selective structures includes multiple resonant elements spaced apart from one another and arranged in a two-dimensional array, the array circumferentially extending along the outer surface of the shaft.

19. A method comprising:
disposing a rotor antenna and a radio frequency (RF) sensor on an outer surface of a shaft configured to rotate about a center axis of the shaft, the RF sensor conductively connected to the rotor antenna and configured to generate measurement signals as the shaft rotates, the rotor antenna configured to transmit the measurement signals across an air gap to a stator antenna; and
disposing one or more frequency selective structures on the outer surface of the shaft, the one or more frequency selective structures configured to dissipate electromagnetic current conducted along the shaft to alleviate interference of the measurement signals, each of the one or more frequency selective structures including a dielectric substrate and a conductive element disposed on the dielectric substrate, wherein the one or more frequency selective structures are disposed on the outer surface of the shaft via an adhesive that bonds an inner surface of the dielectric substrate to the shaft.

20. The method of claim 19, further comprising installing an enclosure to surround at least the rotor antenna, the RF sensor, and the stator antenna, the enclosure being electrically conductive and including first and second side walls that define respective openings through which the shaft protrudes.

21. The method of claim 19, wherein disposing the one or more frequency selective structures on the outer surface of the shaft includes disposing a first frequency selective structure and a second frequency selective structure such that the rotor antenna and the RF sensor are axially disposed between the first and second frequency selective structures along a length of the shaft.

* * * * *